US008289049B2

(12) United States Patent
Matsushima (10) Patent No.: US 8,289,049 B2
(45) Date of Patent: Oct. 16, 2012

(54) SIGNAL LEVEL ADJUSTMENT METHOD, SIGNAL LEVEL ADJUSTMENT SYSTEM AND SIGNAL LEVEL ADJUSTMENT CIRCUIT

(75) Inventor: Yusuke Matsushima, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/727,771

(22) Filed: Mar. 28, 2007

(65) Prior Publication Data

US 2007/0229185 A1  Oct. 4, 2007

(30) Foreign Application Priority Data

Mar. 30, 2006 (JP) .................................. 2006-93496

(51) Int. Cl.
*H03K 19/0175* (2006.01)

(52) U.S. Cl. .............. 326/82; 326/29; 326/31; 327/109; 327/387

(58) Field of Classification Search .................... 326/31, 326/29, 82; 327/387, 108–109
See application file for complete search history.

(56) References Cited

U.S. PATENT DOCUMENTS

| | | | | |
|---|---|---|---|---|
| 6,351,172 B1 * | 2/2002 | Ouyang et al. | ................. | 327/333 |
| 6,518,792 B2 * | 2/2003 | Jong et al. | ......................... | 326/87 |
| 6,674,313 B2 * | 1/2004 | Kurisu et al. | ................. | 327/108 |
| 7,164,299 B2 * | 1/2007 | Nedachi | ......................... | 327/112 |
| 7,323,907 B1 * | 1/2008 | Ku et al. | ......................... | 326/82 |
| 7,345,602 B2 * | 3/2008 | Saeki et al. | ................... | 341/101 |
| 7,348,794 B2 * | 3/2008 | Tanaka | ............................ | 326/26 |
| 7,492,816 B1 * | 2/2009 | Wong et al. | ................... | 375/232 |
| 2003/0193351 A1 * | 10/2003 | Fukui | ............................. | 326/83 |
| 2005/0057280 A1 * | 3/2005 | Groen et al. | .................... | 326/86 |
| 2006/0158225 A1 * | 7/2006 | Stojanovic et al. | ............ | 326/87 |

FOREIGN PATENT DOCUMENTS

JP  2004-336407  11/2004

* cited by examiner

*Primary Examiner* — Jason M Crawford
(74) *Attorney, Agent, or Firm* — McGinn IP Law Group, PLLC (57) ABSTRACT

A signal level adjustment system adjusting a level of signal outputted from a signal output circuit is realized. An input buffer threshold adjustment unit sets a threshold of a signal input circuit to a first variable value. A signal level adjustment unit adjusts an output level of a first signal at the signal output circuit until a voltage of the first signal outputted from the signal output circuit and inputted to the signal input circuit falls into a given range determined based on the threshold.

19 Claims, 10 Drawing Sheets

SIGNAL LEVEL ADJUSTMENT METHOD, SIGNAL LEVEL ADJUSTMENT SYSTEM AND SIGNAL LEVEL ADJUSTMENT CIRCUIT

BACKGROUND OF THE INVENTION

1. Field of the Invention

The present invention relates generally to a signal level adjustment method, a signal level adjustment system and a signal level adjustment circuit, and more particularly to a signal level adjustment method, signal level adjustment system and signal level adjustment circuit capable of adjusting pre-emphasis intensity to a proper value in accordance with transmission line characteristics.

2. Description of the Related Art

In recent years, in semiconductor integrated circuit devices such as LSI, the transmission of data transmitted/received between the semiconductor integrated circuit devices has been speeded up in accordance with the high operating frequency. However, the semiconductor device has encountered a problem that, in transmission lines, high frequency components of data signals are attenuated to distort signal waveforms which causes data transmission errors. Accordingly, demands for using a pre-emphasis technology increases to compensate more properly for attenuation of high frequency components in accordance with characteristics of the semiconductor integrated circuit devices and transmission lines.

The term "pre-emphasis" means that the amplitude of a high frequency component of a data signal is preliminarily intensified in the transmitting side to compensate for attenuation of the high frequency component caused by the transmission lines. When pre-emphasis is performed, the transmitting side increases the amplitude of a high frequency component of a data signal and decreases the amplitude of a low frequency component of the data signal before transmitting the signal to the receiving side. The increasing the amplitude of a high frequency component is called "emphasis", whereas the decreasing the amplitude of a low frequency component is called "de-emphasis".

The expressions "emphasis signal" "emphasis voltage" "emphasis amplitude" and "emphasis processing" used hereinafter mean a signal which has been subjected to emphasis, a voltage of the signal which has been subjected to emphasis, an amplitude of the signal which has been subjected to emphasis, and an emphasis processing, respectively.

Similarly, the expressions "de-emphasis signal" "de-emphasis voltage" "de-emphasis amplitude" and "de-emphasis processing" mean a signal which has been subjected to de-emphasis, a voltage of the signal which has been subjected to de-emphasis, an amplitude of the signal which has been subjected to de-emphasis, and a de-emphasis processing, respectively.

The reason for applying de-emphasis to a low frequency component when performing pre-emphasis is that electric power required for emphasis can be reduced. This is because the purpose of pre-emphasis adjustment in the transmitting side made according to attenuation caused by transmission lines is to make the amplitude of a low frequency component agree with the amplitude of a high frequency component in the receiving side. Thus, as the amplitude of a low frequency component when the amplitude of the low frequency component agrees with the amplitude of a high frequency component becomes smaller, electric power required for emphasis can be reduced.

However, the emphasis processing and de-emphasis processing performed in pre-emphasis cannot be separately controlled from an economical viewpoint, so the de-emphasis amplitude is determined in accordance with the emphasis amplitude. Thus, no method can be used which preliminarily sets the amplitude of a low frequency component to a small value and then makes the amplitude of a high frequency component agree with that amplitude.

Consequently, to adjust pre-emphasis intensity properly, the value of pre-emphasis must be stepwise adjusted until the amplitude of a high frequency component agrees with the amplitude of a low frequency component in the receiving side.

Figure 12:
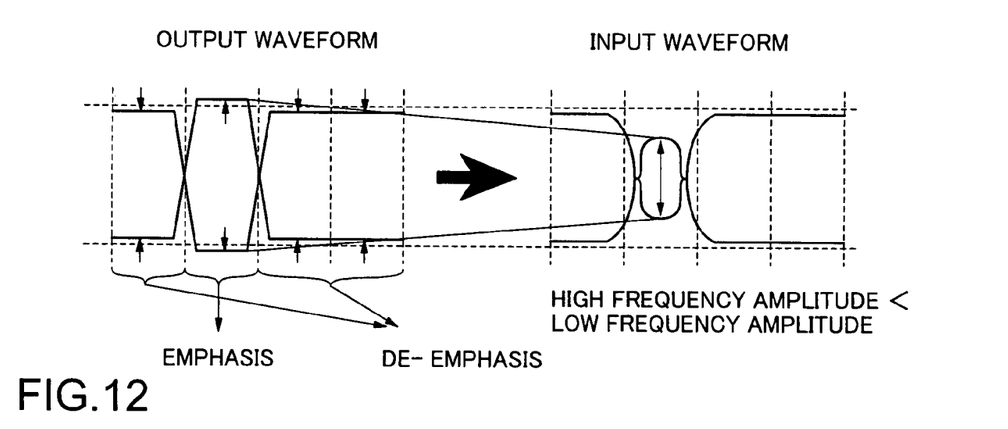
FIG. 12 is an operation explanation diagram when pre-emphasis intensity is insufficient for data transmission.
Figure 13:
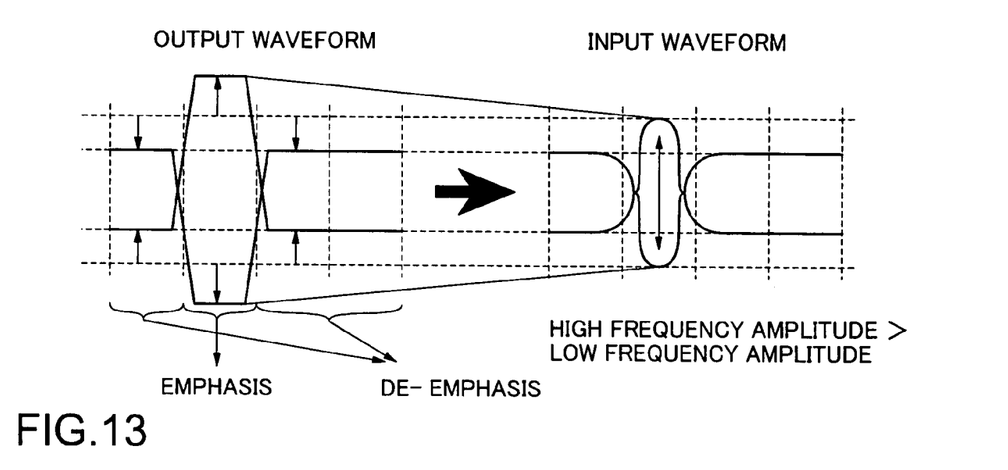
FIG. 13 is an operation explanation diagram when pre-emphasis intensity is excessive for data transmission.
Figure 14:
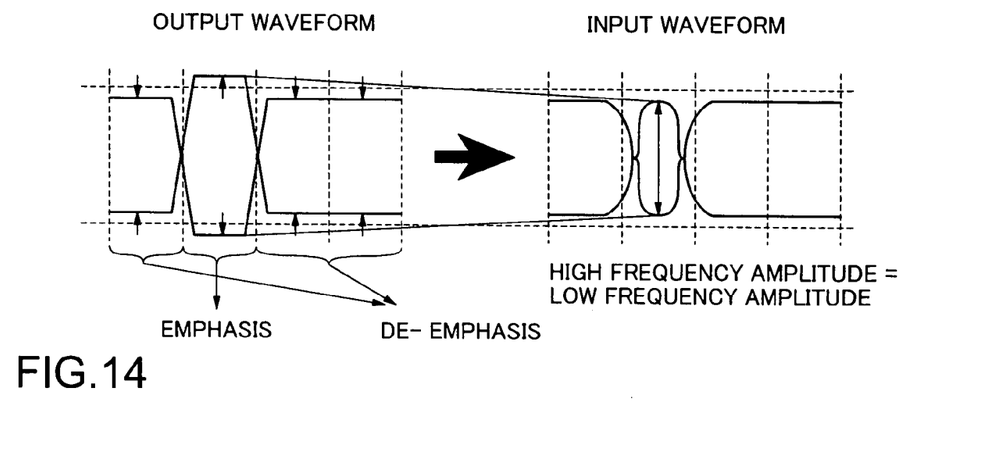
FIG. 14 is an operation explanation diagram when pre-emphasis intensity is adjusted to a proper value for data transmission.

FIGS. 12 to 14 are each a view for explaining the operation of pre-emphasis.

For example, when pre-emphasis intensity is insufficient with respect to the amount of attenuation of a high frequency component in the transmission line, the amplitude of a high frequency component of data signal is, as illustrated in FIG. 12, smaller than the amplitude of a low frequency component. As a result, the eye pattern opening of the data signal at the receiving end becomes small.

Meanwhile, when pre-emphasis intensity is excessive, the amplitude of a high frequency component of a data signal is, as illustrated in FIG. 13, larger than the amplitude of a low frequency component. As a result, the eye pattern opening of the data signal at the receiving end becomes excessively large.

Accordingly, pre-emphasis intensity must be adjusted to a proper value in accordance with the amount of attenuation caused by the transmission line. More specifically, as illustrated in FIG. 14, pre-emphasis intensity must be adjusted to a proper value so that the amplitude of a low frequency component of a data signal agrees with the amplitude of a high frequency component at the receiving end.

An example of this method of adjusting pre-emphasis intensity has been described in Japanese Patent application Laid-Open No. 2004-336407.

Referring to the above patent publication, at the data signal receiving end, the signal level of a high frequency component when the emphasis processing is turned on, is compared with the signal level of a low frequency component when the emphasis processing is turned off. Then, pre-emphasis intensity is adjusted at an output buffer circuit arranged in the data signal transmitting side so that the level difference therebetween is reduced to zero. In this case, when the emphasis processing is turned off, this means that the de-emphasis processing of the amplitude of a low frequency component is not performed, either. Consequently, according to the above patent publication, when the adjustment of pre-emphasis intensity is completed, at the receiving end, the amplitude of a high frequency component when the emphasis processing is turned on, agrees with the amplitude of a low frequency component when the de-emphasis processing is not performed.

However, when pre-emphasis is performed, as described above, the transmitting side applies emphasis to the amplitude of a high frequency component of a data signal and also applies de-emphasis to the amplitude of a low frequency component of the data signal before transmitting the signal to the receiving side. Consequently, according to the invention described in the above patent publication, when pre-emphasis is performed at the intensity used when the adjustment is completed, the amplitude of a high frequency component which has been subjected to emphasis may be excessively larger at the receiving side than the amplitude of a low frequency component which has been subjected to de-emphasis. When the difference between the amplitude of a high frequency component and the amplitude of the low frequency component becomes excessively large, waveform distortion occurs, thus leading to erroneous data determination in the receiving side.

SUMMARY OF THE INVENTION

The present invention was made to solve the foregoing and other exemplary problems, drawbacks, and disadvantages of the conventional structures.

An object of the present invention is to provide a signal level adjustment method, signal level adjustment system and signal level adjustment circuit capable of adjusting pre-emphasis intensity to a proper value in accordance with transmission line characteristics.

In an exemplary embodiment of the present invention to attain the above and other exemplary purposes, a signal level adjustment method for adjusting a level of signal outputted from a signal output circuit, wherein a threshold of a signal input circuit is set to a first variable value, and an output level of a first signal at the signal output circuit is adjusted until a voltage of the first signal outputted from the signal output circuit and inputted to the signal input circuit falls into a given range determined based on the threshold.

In another exemplary embodiment of the present invention, a signal level adjustment system adjusting a level of signal outputted from a signal output circuit, the system includes: an input buffer threshold adjustment unit for setting a threshold of a signal input circuit to a first variable value; and a signal level adjustment unit for adjusting an output level of a first signal at the signal output circuit until a voltage of the first signal outputted from the signal output circuit and inputted to the signal input circuit falls into a given range determined based on the threshold.

In another exemplary embodiment of the present invention, a signal level adjustment circuit includes: an input buffer threshold adjustment unit for causing fixed data of logic "X" to be transmitted from an output buffer circuit and setting a threshold of an input buffer circuit to a value equal to or more than a de-emphasis voltage observed at a receiving end of the input buffer circuit; and a pre-emphasis intensity adjustment unit for causing a data signal containing one logic "X" to be transmitted from the output buffer circuit after setting the threshold, and varying pre-emphasis intensity of the output buffer circuit and then returning control back to the input buffer threshold adjustment unit until an output signal of a flip-flop contains "X", the flip-flop latching an output signal of the input buffer circuit and outputting the latched signal.

As such, the inventive signal level adjustment method, signal level adjustment system and signal level adjustment circuit have an advantageous effect that pre-emphasis intensity can be adjusted to a proper value in accordance with transmission line characteristics.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The above and other objects, features and advantages of the present invention will become more apparent from the following detailed description when taken in conjunction with the accompanying drawings wherein.

DETAILED DESCRIPTION OF THE PREFERRED EMBODIMENTS

Preferred embodiments of the present invention will now be described in detail in accordance with the accompanying drawings.

Figure 1:
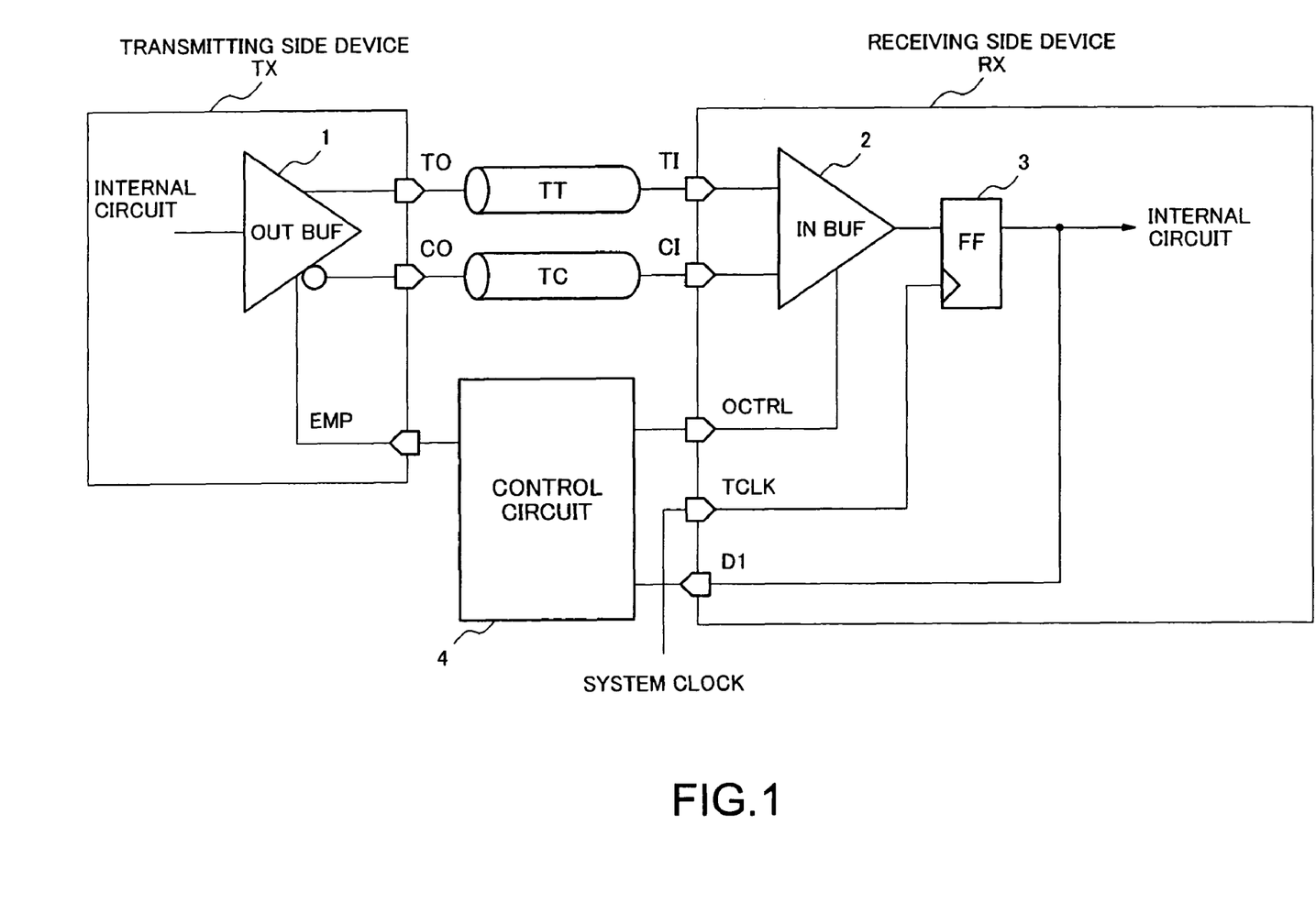
FIG. 1 is a system configuration diagram illustrating a first embodiment of a signal level adjustment system according to the present invention.

FIG. 1 is a system configuration diagram illustrating a first embodiment of a signal level adjustment system according to the present invention.

As illustrated in FIG. 1, the system according to the first embodiment includes a data signal transmitting side device TX, a data signal receiving side device RX, a control circuit 4 acting as the gist of the present invention, and transmission lines TT and TC for connecting the devices TX and RX.

The transmitting side device TX and the receiving side device RX may be a semiconductor integrated circuit device, or alternatively may be a package being one portion thereof. The transmission lines TT and TC are a known transmission line for differential signal; the abbreviation "TT" means Transmitter True, and "TC" means Transmitter Complement. In FIG. 1, reference characters TO and CO denote terminals of the transmitting side device TX arranged for the transmission lines TT and TC, respectively; TI and CI denote terminals of the receiving side device RX arranged for the transmission lines TT and TC, respectively. The abbreviations "TO" "CO" mean Transmitter OUTPUT and Complement OUTPUT, respectively; the abbreviations "TI" "CI" mean Transmitter INPUT and Complement INPUT, respectively.

As illustrated in FIG. 1, the transmitting side device TX has a later described output buffer circuit (OUTBUF) 1. The receiving side device RX has a later described input buffer circuit (INBUF) 2 and a flip-flop (FF) 3.

Having such configuration, the transmitting side device TX converts by use of the output buffer circuit 1, serial data sent from an internal circuit, e.g., a parallel-serial conversion circuit into a differential signal and then outputs the differential signal to the transmission lines TT and TC.

The receiving side device RX converts by use of the input buffer circuit 2, the differential signal inputted from the transmission lines TT and TC into serial data and then outputs the serial data via the FF3 to an internal circuit, e.g., a serial-parallel conversion circuit.

To compensate for attenuation of a high frequency component caused by the transmission lines TT and TC, the control circuit 4 adjusts by a later described method, pre-emphasis intensity of the output buffer circuit 1 prior to the system operation.

Referring to FIG. 1, there is illustrated a configuration in which the control circuit 4 is separated from the data signal transmitting side device TX and receiving side device RX; but the control circuit 4 may be arranged in the data signal transmitting side device TX or in the receiving side device RX.

The output buffer circuit 1 is provided with a function capable of adjusting pre-emphasis intensity based on a control signal EMP supplied from the outside. For example, as the control signal EMP increases from ALL "0" to ALL "1", the output buffer circuit 1 varies its pre-emphasis intensity from minimum to maximum. As the output buffer circuit 1, any known configuration can be used as long as pre-emphasis intensity can be adjusted based on the control signal EMP; for example, the output buffer circuit described in the aforementioned Patent Document 1 may be used.

When a bit signal supplied changes from "0" to "1" or changes from "1" to "0", the output buffer circuit 1 performs a pre-emphasis processing at the intensity specified in the pre-emphasis. Also, when the same signal (for example, 1 or 0) continues, the output buffer circuit 1 performs a de-emphasis processing at the intensity specified in the pre-emphasis.

The input buffer circuit 2 is provided with a function capable of adjusting based on a control signal OCTRL supplied from the outside, a threshold Vt for determining whether input data is "1" or "0". As the input buffer circuit 2, any configuration can be used as long as the threshold Vt can be adjusted based on the OCTRL.

The control signal EMP for the output buffer circuit 1 and the control signal OCTRL for the input buffer circuit 2 are each supplied from the control circuit 4.

FF3 receives as a clock input thereof, a clock TCLK supplied from the outside, and latches an output value of the input buffer circuit 2 at a timing when the clock TCLK changes from "1" to "0" or changes from "0" to "1". The latched value is outputted, as an output signal D1, to the control circuit 4 and the internal circuit.

As the clock TCLK, a system clock used in the inventive signal level adjustment system, or a clock or the like generated from the system clock is used.

The control circuit 4 adjusts pre-emphasis intensity of the output buffer circuit 1 and thereby performs control so that an emphasis amplitude and a de-emphasis amplitude inputted to the input buffer circuit 2 agree substantially with each other.

The control circuit 4 may be constituted of, for example, an LSI or the like including a logic circuit and memory. Also, the control circuit 4 may have a configuration which includes a CPU or DSP, and a memory, and implements the function by the CPU or DSP executing a signal processing according to a program stored in the memory.

The block configuration and operation of the control circuit 4 according to the present embodiment will now be described with reference to FIGS. 2 to 6.

Figure 2:
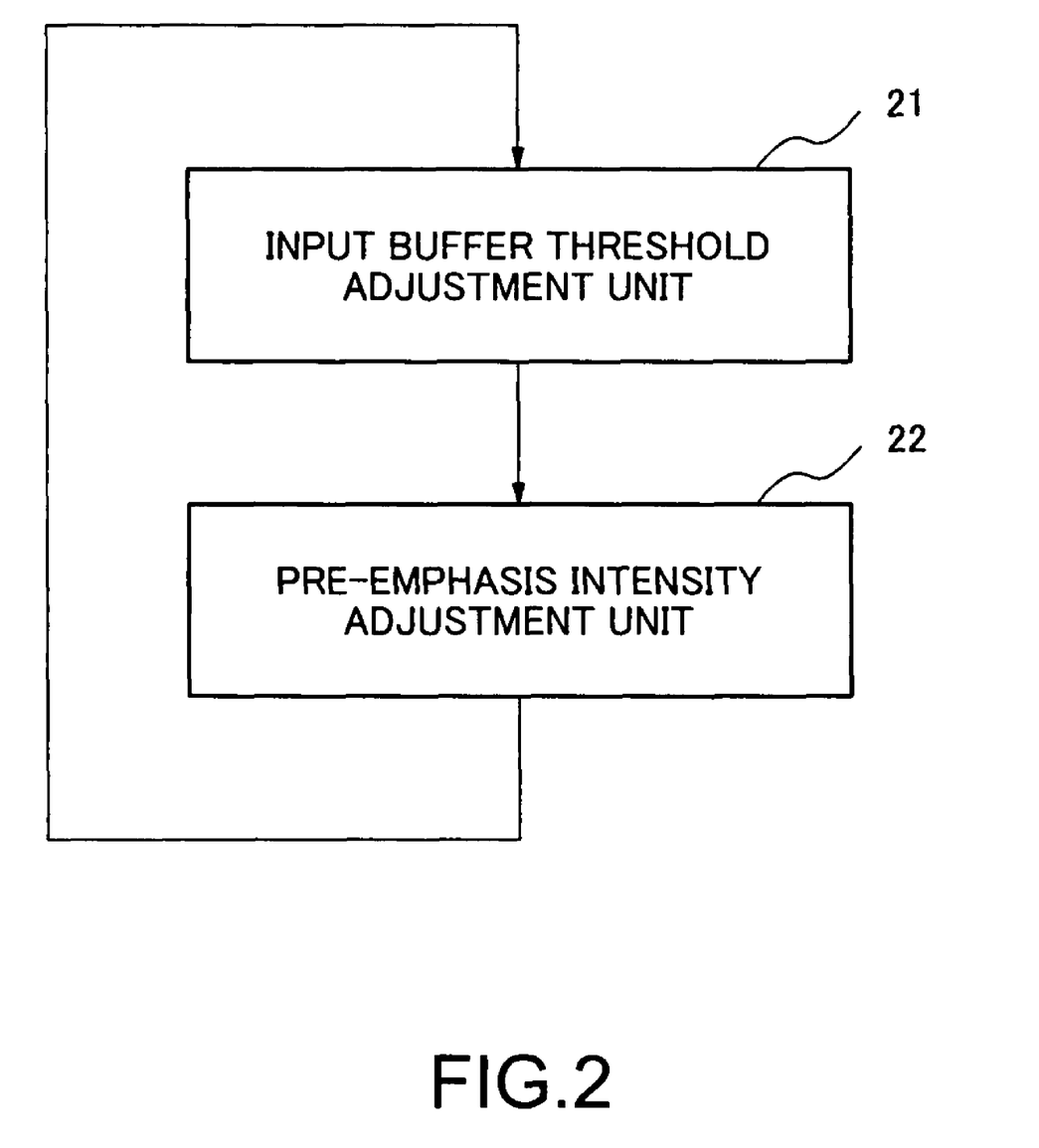
FIG. 2 is a block diagram illustrating the first embodiment of a control circuit of FIG. 1.

FIG. 2 is a block diagram of the control circuit 4 according to the present embodiment.

An input buffer threshold adjustment unit 21 causes fixed data of "1" to be transmitted from the output buffer circuit 1. Then, using the control signal OCTRL, the input buffer threshold adjustment unit 21 performs a processing of causing the threshold of the input buffer circuit 2 to be set to a value equal to or more than a de-emphasis voltage observed at the receiving end of the input buffer circuit 2.

After the above processing has been executed by the input buffer threshold adjustment unit 21, a pre-emphasis intensity adjustment unit 22 causes a data signal including one "1" to be transmitted from the output buffer circuit 1. Then, if the output signal of the FF3 is all "0", the pre-emphasis intensity adjustment unit 22 varies pre-emphasis intensity by use of the control signal EMP and then returns control back to the input buffer threshold adjustment unit 21. The pre-emphasis intensity adjustment unit 22 repeats the above processing until the output signal of the FF3 changes to "1".

Figure 3:
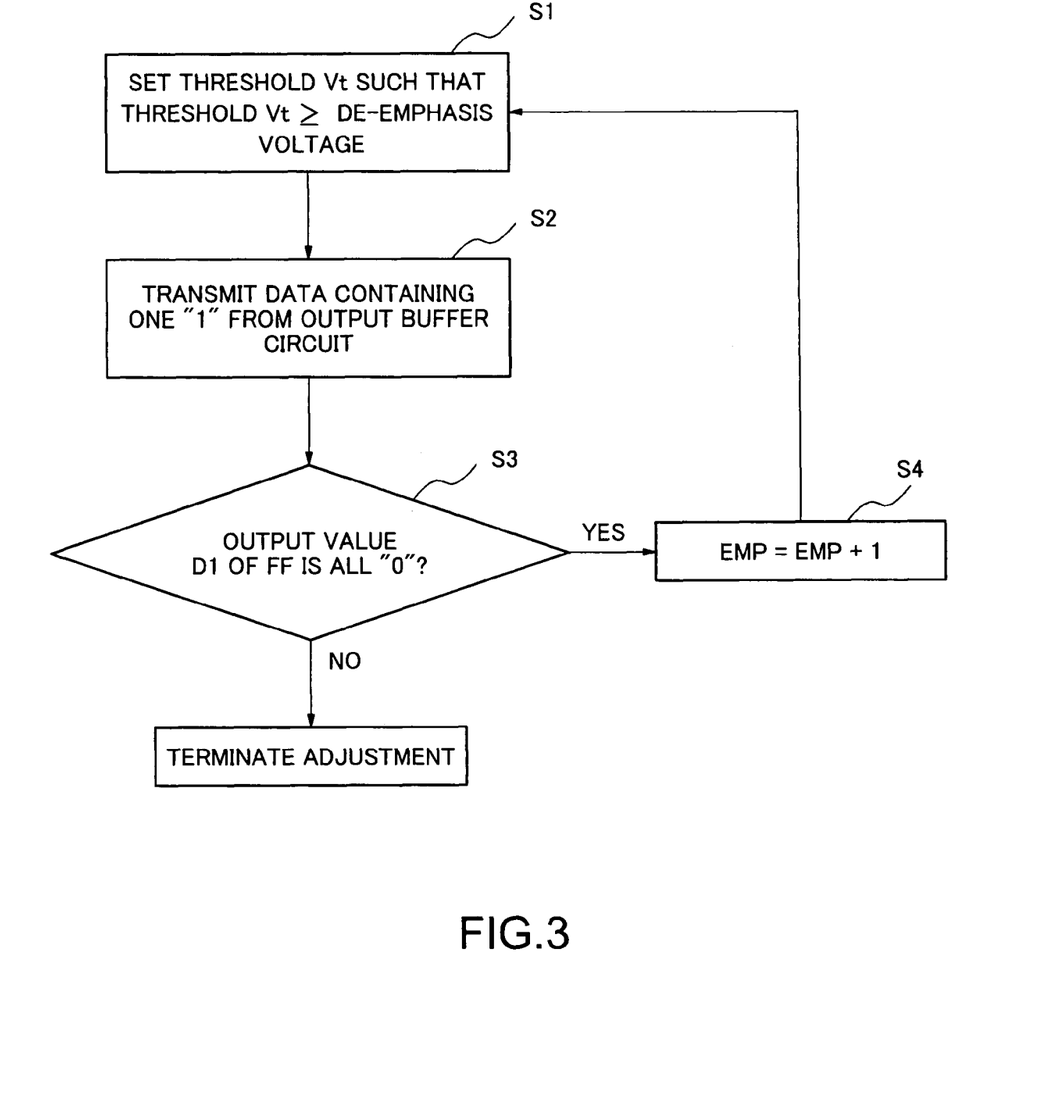
FIG. 3 is an operating flow chart illustrating the first embodiment of the control circuit of FIG. 1.

FIG. 3 is an operating flow chart illustrating the first embodiment of the control circuit 4.

As illustrated in FIG. 3, the control circuit 4 according to the first embodiment has a first adjustment step (step S1), a second adjustment step (step S2) and a third adjustment step (steps S3 and S4). At the first adjustment step (step S1), the threshold Vt of the input buffer circuit 2 is set according to a de-emphasis voltage observed at the receiving end. At the second adjustment step (step S2), a data signal (hereinafter referred to as "random data") containing one "1" is transmitted from the output buffer circuit 1. At the third adjustment step (steps S3 and S4), an output signal of the FF3 is measured to adjust pre-emphasis intensity.

First the first adjustment step of the control circuit 4 will be described with reference to FIGS. 3 and 4.

Figure 4:
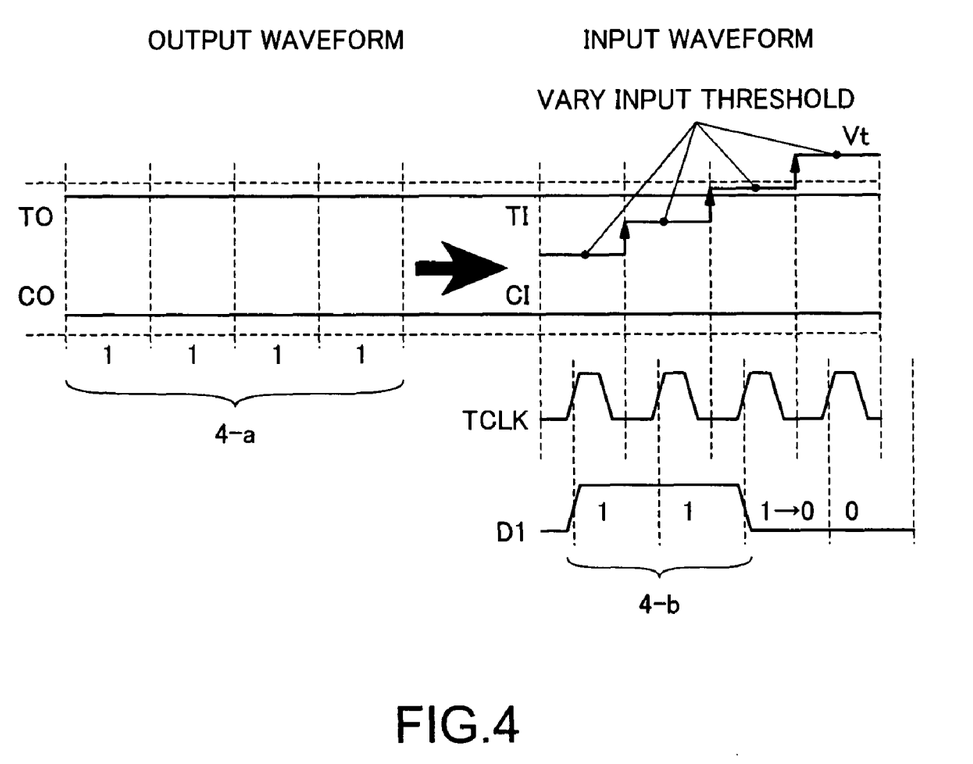
FIG. 4 is an explanation diagram of an operation at a first adjustment step of the control circuit according to the first embodiment.

FIG. 4 is an explanation diagram of an operation at the first adjustment step of the control circuit 4.

First the input buffer threshold adjustment unit 21 of the control circuit 4 sets to "0", the control signal EMP to be supplied to the output buffer circuit, 1, thereby setting pre-emphasis intensity of the output buffer circuit 1 to a smallest value. Subsequently, the input buffer threshold adjustment unit 21 causes fixed data "1" to be transmitted from the output buffer circuit 1 via the transmission line TO/CO (FIG. 4, 4-$a$).

Also, the fixed data transmitted from the output buffer circuit 1 may be generated by the input buffer threshold adjustment unit 21 and then supplied to the output buffer circuit 1. Alternatively, this fixed data may be outputted using a function of a transmitting side circuit including the output buffer circuit 1, according to an instruction from the input buffer threshold adjustment unit 21. In this case, the output buffer circuit 1 outputs continuously a voltage of logic 1 with no de-emphasis applied thereto.

Subsequently, the input buffer threshold adjustment unit 21 sets the control signal OCTRL of the input buffer circuit 2 to a value which causes the threshold to become 0 and then measures the output signal D1 of the FF3.

Here, the pre-emphasis intensity set at the output buffer circuit 1 is insufficient (initial value being "0") and a de-emphasis voltage is large, so "1" is outputted from the input buffer circuit 2. This "1" outputted from the input buffer circuit 2 is supplied to the FF3 at a timing when the clock TCLK changes from "0" to "1", and thus the output signal D1 changes to "1" (FIG. 4, 4-$b$).

Subsequently, the input buffer threshold adjustment unit 21 varies the control signal OCTRL of the input buffer circuit 2 to raise the threshold Vt. Then, when the threshold Vt is equal to or more than a de-emphasis voltage observed at the input end of the input buffer circuit 2, the output signal of the input buffer circuit 2 changes from "1" to "0". This "0" outputted from the input buffer circuit 2 is supplied to the FF3 at a timing when the clock TCLK changes from "0" to "1", and thus the output signal D1 changes to "0" (FIG. 4, 4-c). At this time, the threshold Vt of the input buffer circuit 2 is equal to or more than a de-emphasis voltage observed at the input end of the input buffer circuit 2. Here, assume that, even when the threshold Vt of the input buffer circuit 2 is equal to a de-emphasis voltage observed at the input end of the input buffer circuit 2, the output signal D1 changes to "0".

The second and third adjustment steps of the control circuit 4 will be described with reference to FIGS. 3, 5 and 6.

Figure 5:
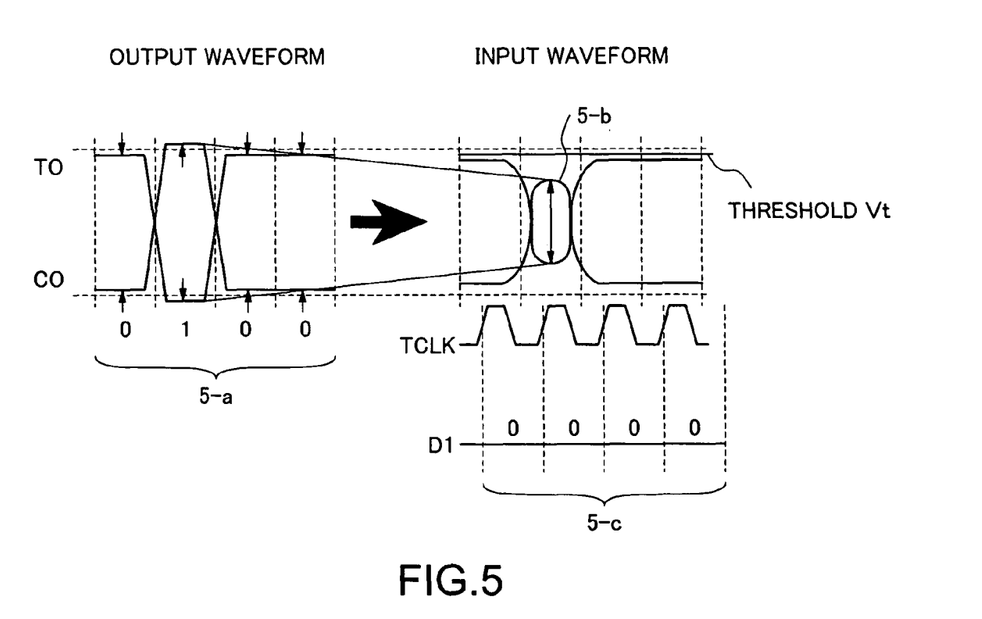
FIG. 5 is an explanation diagram of an operation at a second adjustment step of the control circuit according to the first embodiment.
Figure 6:
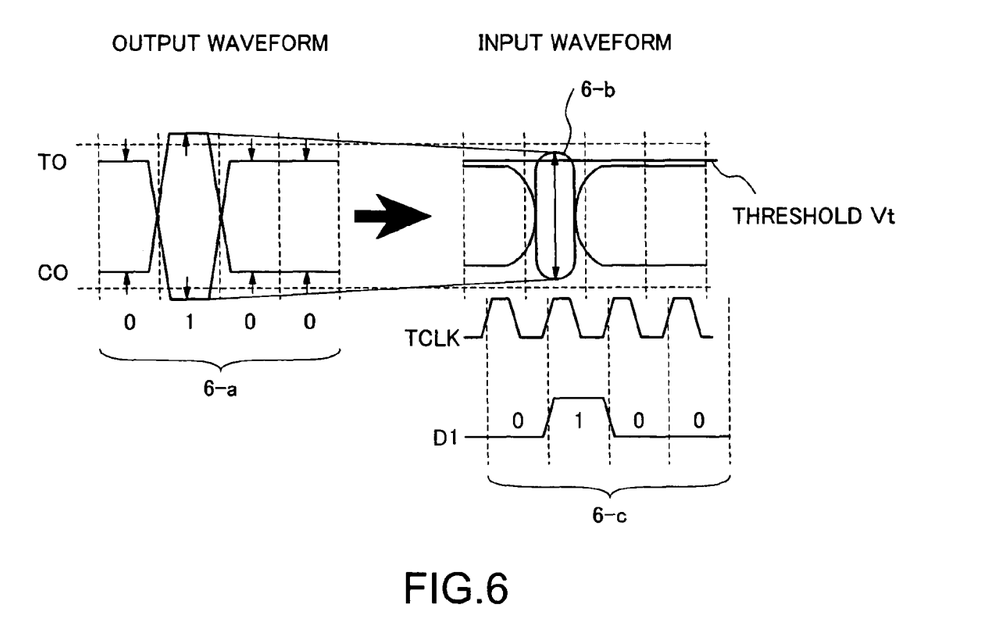
FIG. 6 is an explanation diagram of the operation at the second adjustment step of the control circuit according to the first embodiment.

FIGS. 5 and 6 are each an explanation diagram of an operation at the second adjustment step of the control circuit 4.

FIG. 5 is an operation explanation diagram when pre-emphasis intensity is insufficient; FIG. 6 is an operation explanation diagram when pre-emphasis intensity is sufficient.

At the second adjustment step, the pre-emphasis intensity adjustment unit 22 of the control circuit 4 causes data containing one "1" to be outputted from the output buffer circuit 1. Referring to FIGS. 5 and 6, "0100" is outputted via the TO/CO (5-a and 6-b).

At this time, the control signal OCTRL supplied to the input buffer circuit 2 is kept at a value observed when the output signal D1 of the FF3 changed from "1" to "0" at the first adjustment step.

Referring to FIGS. 5 and 6, the threshold of the input buffer circuit 2 is set to a value larger than a de-emphasis voltage; but the threshold may be set to a value equal thereto.

Also, the data transmitted from the output buffer circuit 1 may be generated by the pre-emphasis intensity adjustment unit 22 and then supplied to the output buffer circuit 1, or alternatively this data may be outputted using a function of a transmitting side circuit including the output buffer circuit 1, according to an instruction from the pre-emphasis intensity adjustment unit 22.

Here, when the pre-emphasis intensity set at the output buffer circuit 1 is insufficient, a data signal with an emphasis amplitude smaller than a de-emphasis amplitude is inputted to the input buffer circuit 2 (FIG. 5, 5-b). Then, the output signal D1 of the FF3 changes to all "0" (FIG. 5, 5-c).

Meanwhile, when the pre-emphasis intensity set at the output buffer circuit 1 is sufficient, a data signal with an emphasis amplitude larger than a de-emphasis amplitude is inputted to the input buffer circuit 2 (FIG. 6, 6-b) Then, the output signal D1 of the FF3 changes from "0" to "1" at a timing when the clock TCLK changes from "0" to "1" (FIG. 6, 6-c).

At the third adjustment step, the pre-emphasis intensity adjustment unit 22 determines whether or not the output signal D1 of the FF3 is all "0" (step S3 of FIG. 3). If the output signal D1 of the FF3 is all "0", the pre-emphasis intensity adjustment unit 22 increases the pre-emphasis intensity of the output buffer circuit 1 by use of the control signal EMP (EMP=EMP+1, step S4 of FIG. 3). Then, the pre-emphasis intensity adjustment unit 22 executes the first adjustment step again. At step S3 of FIG. 3, if the output signal D1 of the FF3 changes from "0" to "1", the pre-emphasis intensity adjustment unit 22 terminates the adjustment step.

In the signal level adjustment system according to the present embodiment, first the threshold Vt of the input buffer circuit 2 is set to a value equal to or more than a de-emphasis voltage value observed at the receiving end. Subsequently, the signal level adjustment system causes data containing one "1" to be transmitted from the output buffer circuit 1 and then measures an output signal of the FF3 corresponding to this data. If the output signal D1 of the FF3 is "0", the signal level adjustment system adjusts pre-emphasis intensity at the output buffer circuit 1 and then repeats the first threshold setting processing. The signal level adjustment system repeats the above processing until the output signal D1 of the FF3 changes from "0" to "1".

When pre-emphasis intensity is adjusted in this manner at the output buffer circuit 1, a de-emphasis voltage and an emphasis voltage at the receiving end become substantially equal to each other; and there is achieved pre-emphasis intensity by which the amplitude of a high frequency component and the amplitude of a low frequency component of a data signal at the receiving end are made equal to each other and the frequency characteristic of the high frequency component becomes flat.

Consequently, the present invention has an advantageous effect capable of adjusting pre-emphasis intensity to a proper value in accordance with the amount of attenuation caused by the transmission line.

Figure 7:
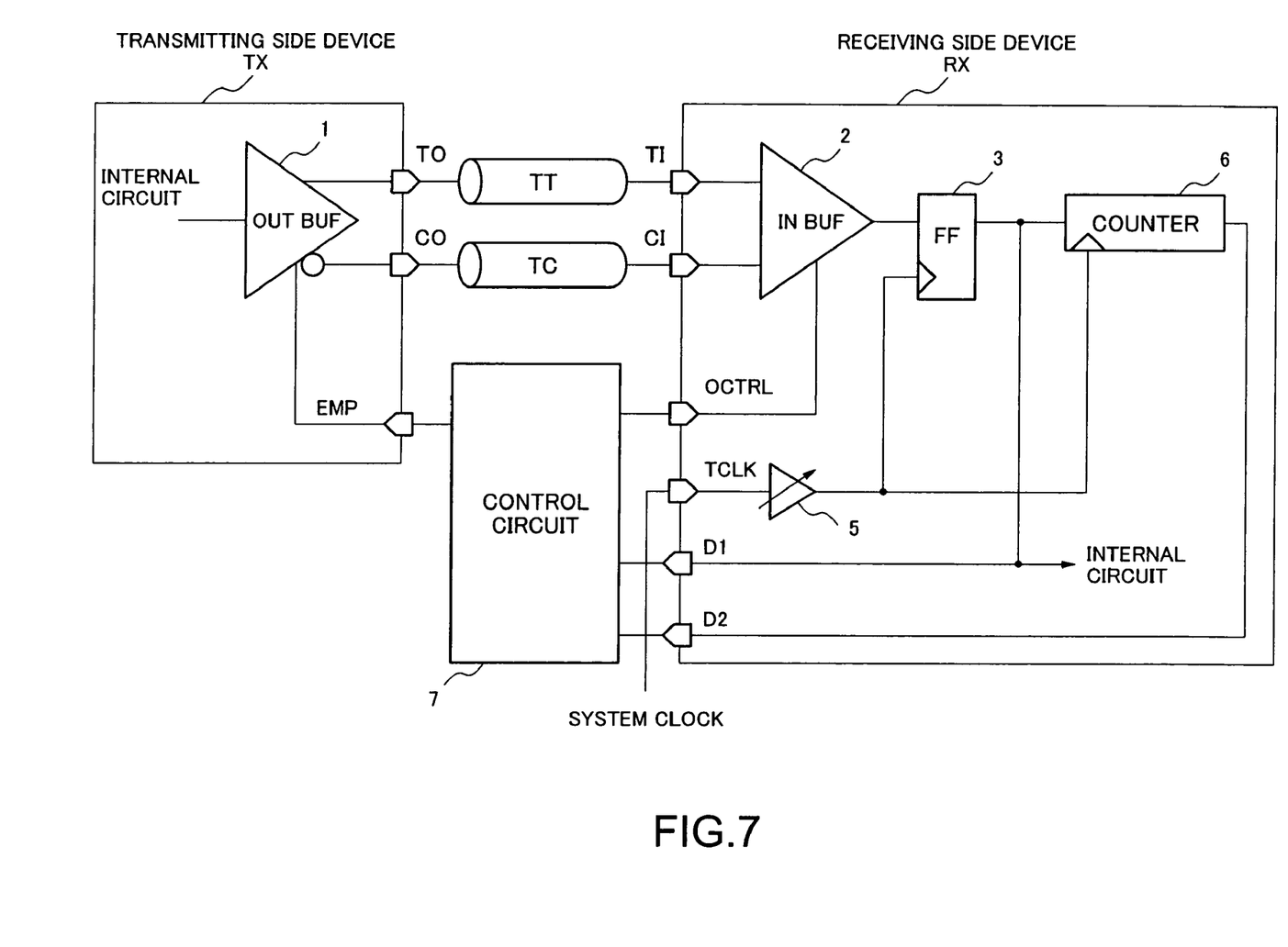
FIG. 7 is a system configuration diagram illustrating a second embodiment of a signal level adjustment system according to the present invention.

FIG. 7 is a block diagram illustrating a second embodiment of a signal level adjustment system according to the present invention.

The signal level adjustment system according to the second embodiment includes a variable delay unit 5 and a counter 6 in addition to the configuration of the signal level adjustment system according to the first embodiment illustrated in FIG. 1.

The variable delay unit 5 delays according to an instruction from a control circuit 7, a clock TCLK to be supplied to an FF3 and the counter 6 by a plurality of delay amounts. As the variable delay unit 5, any known circuit may be used as long as the delay amount of the clock TCLK can be stepwise controlled according to an instruction from the control circuit 7.

The counter 6 counts the number of "1"s outputted from the FF3 at each timing when the delay amount of the clock TCLK is varied; if a predetermined number of "1"s are counted, an output signal D2 is outputted as a significant value.

The block configuration and operation of the control circuit 7 according to the present embodiment will now be described with reference to FIGS. 8 and 9.

Figure 8:
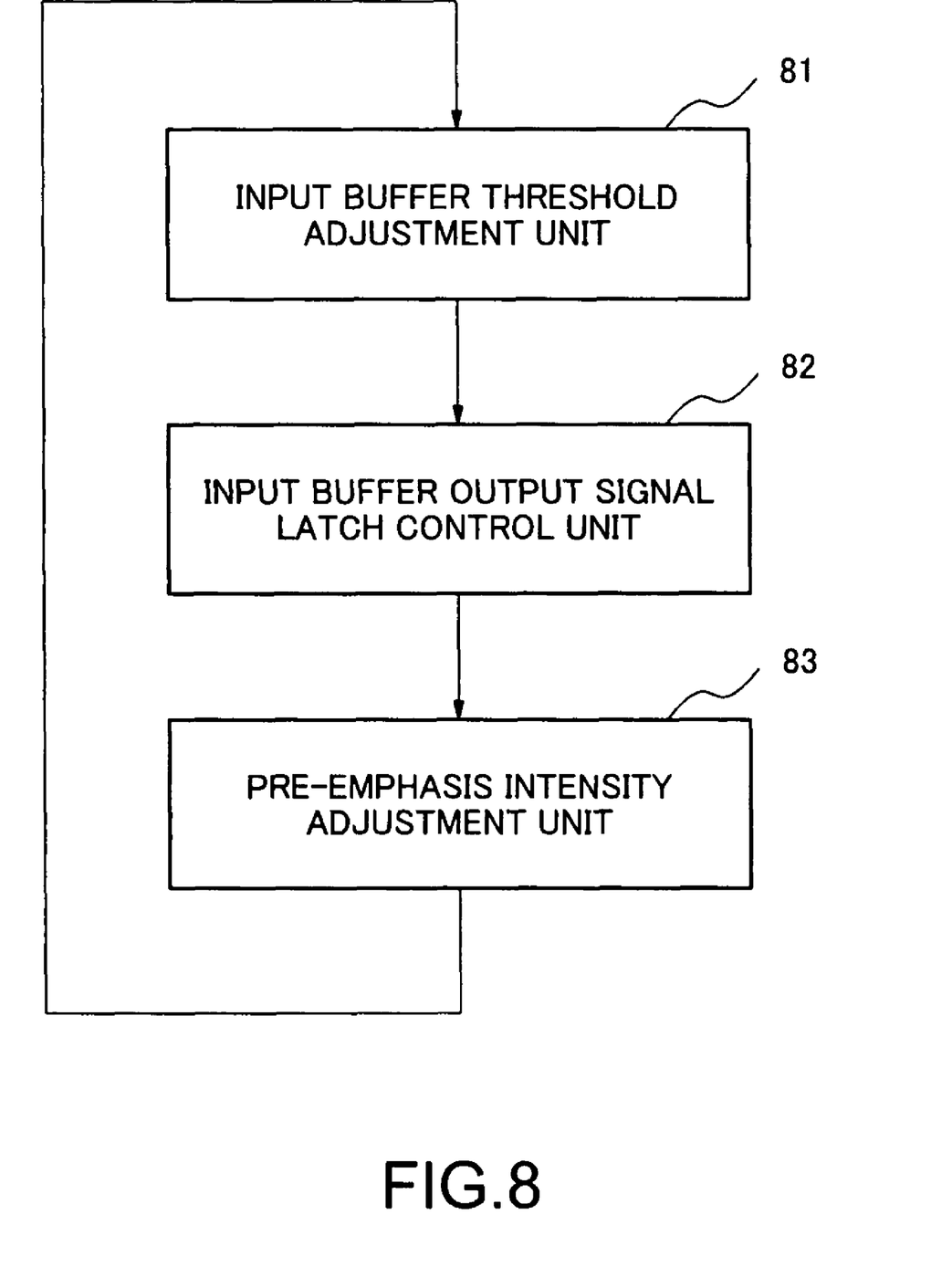
FIG. 8 is a block diagram illustrating the second embodiment of the control circuit of FIG. 7.

FIG. 8 is a block diagram of the control circuit 7 according to the present embodiment.

Referring to FIG. 8, first an input buffer threshold adjustment unit 81 adjusts the threshold. The method thereof is identical to that of the input buffer threshold adjustment unit 21 and hence an explanation thereof is omitted.

After the threshold adjustment, an input buffer output latch control unit 82 causes data containing one "1" to be repeatedly transmitted at a predetermined time interval from an output buffer circuit 1. Then, the input buffer output latch control unit 82 causes the variable delay unit 5 to vary the delay amount of clock at the predetermined time interval and causes the FF3 to latch an output signal of an input buffer circuit 2. In this case, an arrangement is made so that the number of repetitions can be arbitrarily set in the system. Then, when the predetermined number of repetitions is reached, the input buffer output latch control unit 82 hands control over to a pre-emphasis intensity adjustment unit 83.

The pre-emphasis intensity adjustment unit 83 varies the pre-emphasis intensity of the output buffer circuit 1 by use of a control signal EMP and returns control back to the input buffer threshold adjustment unit 81 until the counter 6 outputs a significant value. When the counter 6 outputs a significant value, i.e., when the number of "1"s outputted from the FF3 reaches a predetermined value, then the pre-emphasis intensity adjustment unit 83 terminates the adjustment process.

Figure 9:
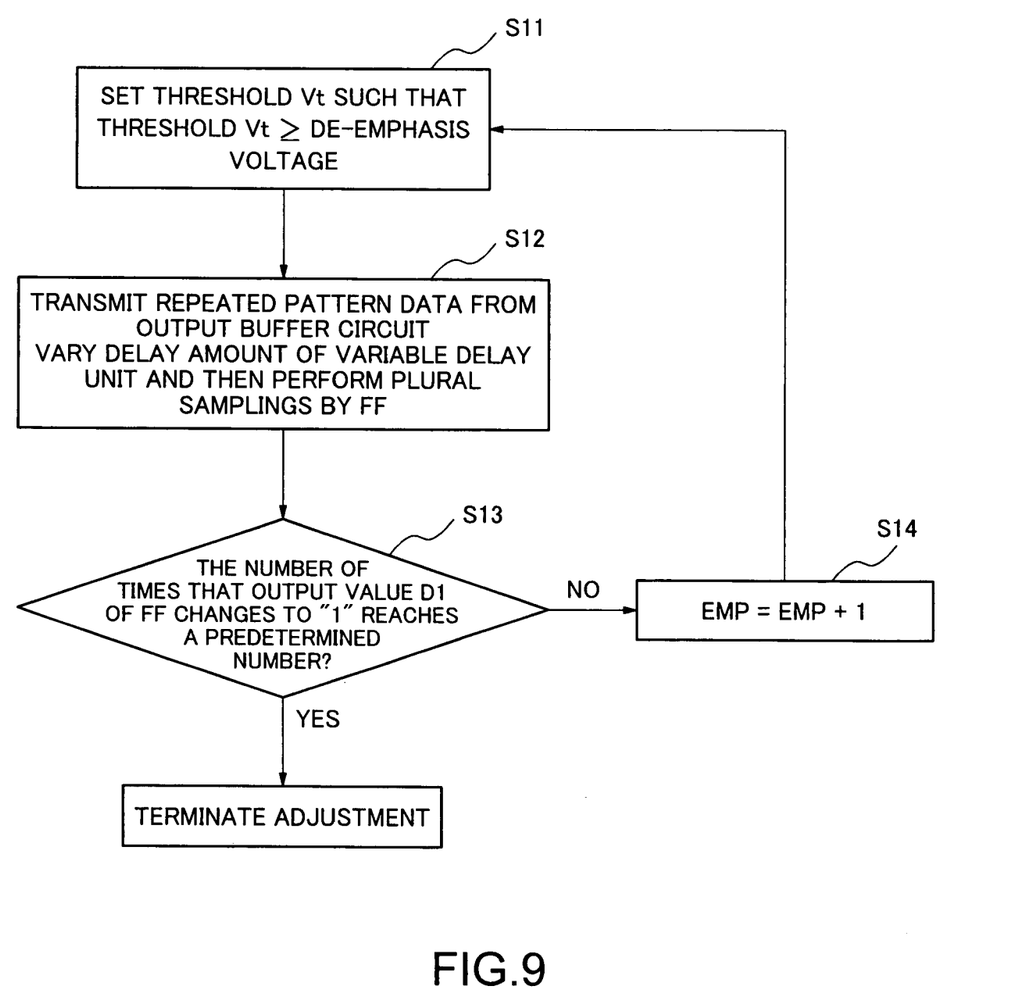
FIG. 9 is an operating flow chart illustrating the second embodiment of the control circuit of FIG. 7.
Figure 10:
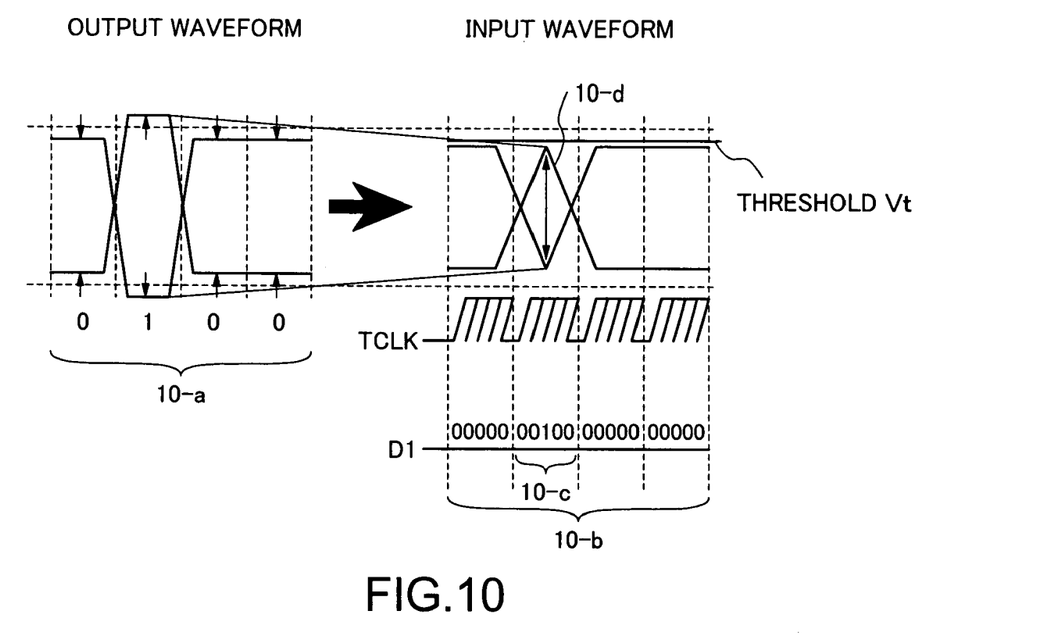
FIG. 10 is an explanation diagram of an operation at a second adjustment step of the control circuit according to the second embodiment.
Figure 11:
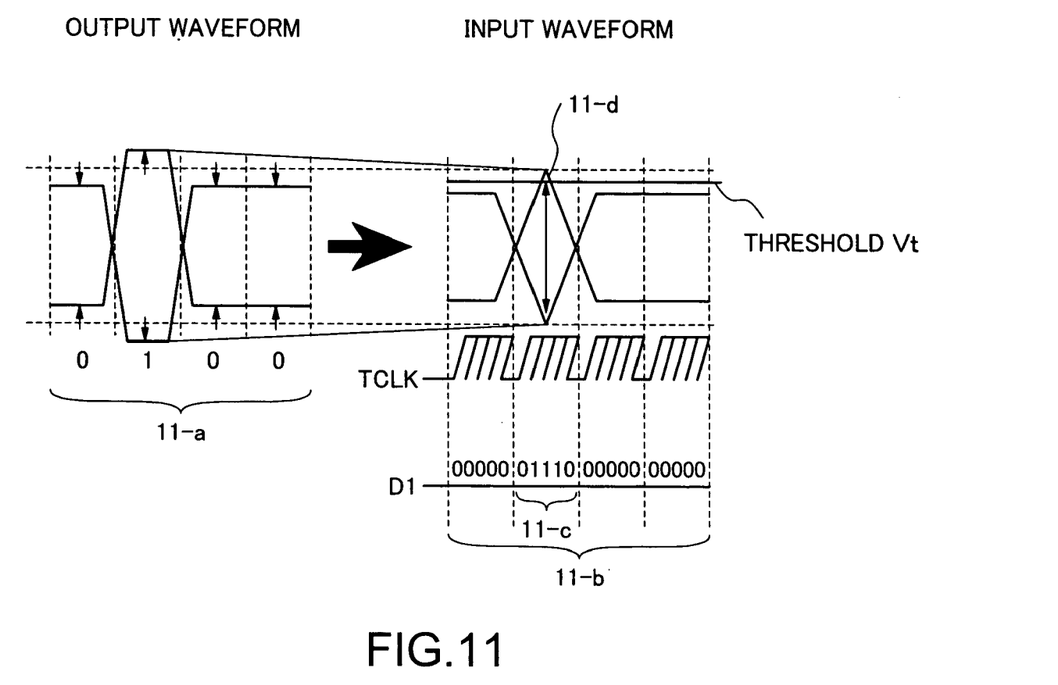
FIG. 11 is an explanation diagram of the operation at the second adjustment step of the control circuit according to the second embodiment.

FIG. 9 is a flowchart illustrating a procedure of the control circuit 7 according to the second embodiment of the present invention. FIGS. 10 and 11 are each an explanation diagram of an operation at a second adjustment step of the control circuit 7 according to the second embodiment.

FIG. 10 is an operation explanation diagram when pre-emphasis intensity is insufficient; FIG. 11 is an operation explanation diagram when pre-emphasis intensity is proper.

As illustrated in FIG. 9, first the input buffer threshold adjustment unit 81 of the control circuit 7 according to the second embodiment performs a first adjustment step according to a procedure similar to that of the first embodiment. More specifically, the input buffer threshold adjustment unit 81 sets a threshold Vt of the input buffer circuit to a value equal to or more than a de-emphasis voltage observed at the receiving end of the input buffer circuit (step S11). As a result, a control signal OCTRL supplied to the input buffer circuit 2 is kept at a value observed when the output signal D1 of the FF3 changes from "1" to "0".

Subsequently, at a second adjustment step, the input buffer output latch control unit 82 causes a data signal containing one "1" and having the same data transition pattern to be transmitted at a predetermined time interval from the output buffer circuit (FIG. 10, 10-*a* and FIG. 11, 11-*a*). Further, the input buffer output latch control unit 82 varies stepwise the delay amount of the clock TCLK at the predetermined time interval and causes the FF3 to latch an output signal of the input buffer circuit 2 (step S12). In this case, an arrangement is made so that the number of repeated transmissions of the data signal having the same data transition pattern can be arbitrarily set in the system. Then, when the predetermined number of repetitions is reached, the input buffer output latch control unit 82 hands control over to the pre-emphasis intensity adjustment unit 83.

A plurality of the latch operations are illustrated in 10-*b* of FIGS. 10 and 11-*b* of FIG. 11. Referring to 10-*b* of FIG. 10, a waveform 10-*d* of "1" has a sharp angle and its waveform peak is substantially equal to the threshold, so "00100" is outputted; and referring to 11-*b* of FIG. 11, the waveform 10-*d* of "1" has a sharp angle and its waveform peak is larger than the threshold, so "01110" is outputted.

As seen from the two figures, the TCLK is stepwise delayed; and the output signal latched by the FF3 according to the clock is illustrated as D1.

In this case, the repeated pattern data transmitted from the output buffer circuit 1 may be generated by the input buffer output latch control unit 82 of the control circuit 7 and then supplied to the output buffer circuit. Alternatively, the repeated pattern data may be outputted using a function of a transmitting side circuit including the output buffer circuit 1, according to an instruction from the input buffer output latch control unit 82.

The counter 6 counts the number of times that the output signal D1 of the FF3 changes to "1". When the number of "1"s outputted from the FF3 reaches a predetermined value, the counter 6 outputs an output signal D2 as a significant value.

At the third adjustment step of the control circuit 7, the pre-emphasis intensity adjustment unit 83 determines whether or not the output signal D2 of the counter 6 is a significant value (step S13). If the output signal D2 of the counter 6 is not a significant value, the pre-emphasis intensity adjustment unit 83 increases the pre-emphasis intensity of the output buffer circuit by use of the control signal EMP (EMP=EMP+1, step S14). Then, the pre-emphasis intensity adjustment unit 83 returns to the first adjustment step, whereby the adjustment of threshold Vt of the input buffer circuit 2 is repeated. Meanwhile, at step S13, if the output signal D2 of the counter 6 is a significant value, the pre-emphasis intensity adjustment unit 83 terminates the adjustment step.

When performed in this manner, the second embodiment has an advantageous effect that pre-emphasis intensity can be adjusted to a more proper value, compared to the first embodiment.

For example, as illustrated in FIG. 10, there is a case where the data signal waveform at the receiving end has a sharp angle and its waveform peak is larger than the threshold (FIG. 10, 10-*d*). When the timing when the clock TCLK changes from "0" to "1", or changes from "1" to "0", agrees with the data signal waveform peak at the receiving end, then the output signal D1 of the FF3 changes to "1" (10-*c* of FIG. 10).

However, due to waveform distortion or the like, there is a case where the timing when the clock TCLK changes from "0" to "1", or changes from "1" to "0", does not agree with the data signal waveform peak at the receiving end. In such a case, the output signal D1 of the FF3 is "0".

In the signal level adjustment system of the first embodiment, when waveform distortion is severe, pre-emphasis intensity may be excessively adjusted until the output signal D1 of the FF3 changes to "1".

Meanwhile, according to the second embodiment, the TCLK is delayed plural times and the number of times that the output signal of the FF3 changes to "1" is counted; and when a predetermined number of times is reached, the pre-emphasis intensity adjustment step is terminated. That is, according to the second embodiment, a data signal waveform is measured plural times at a short time interval, so even when the data signal waveform at the receiving end has a sharp angle and is distorted, the adjustment step can be terminated before pre-emphasis intensity becomes excessive.

In the present embodiment, there was described an example in which the number of "1"s outputted from the FF is counted using the counter 6, and when the number of "1"s reaches a predetermined value, the output signal D2 is set to a significant value. However, when the number of times that the output signal D1 of the FF changes to "1" is counted by the control circuit 7 and it is determined whether or not a predetermined number of times has been reached, then the counter 6 can be omitted.

In the signal level adjustment system according to the second embodiment, first the threshold Vt of the input buffer circuit is set to a value equal to or more than a de-emphasis voltage observed at the receiving end. Subsequently, the signal level adjustment system measures an output signal of the FF during transmission of repeated pattern data while varying the delay amount of clock by use of the variable delay unit 5. Then, the signal level adjustment system counts the number of times that the output signal D1 of the FF changes to "1", and adjusts pre-emphasis intensity at the output buffer until the number of times that the output signal D1 changes to "1" reaches a predetermined value. As a result, a de-emphasis voltage and an emphasis voltage at the receiving end become equal to each other. That is, there is achieved pre-emphasis intensity by which the amplitude of a high frequency component and the amplitude of a low frequency component of a data signal at the receiving end are made equal to each other and the frequency characteristic becomes flat.

Consequently, there is achieved an advantageous effect that pre-emphasis intensity can be adjusted to a proper value in accordance with transmission line characteristics.

Further, according to the present embodiment, there is also achieved an advantageous effect that the adjustment step can be terminated before pre-emphasis intensity becomes excessive, as compared to the first embodiment.

In the above described first embodiment and second embodiment, first the threshold of the input buffer circuit is set to a value equal to or more than a de-emphasis voltage of logic "1". Then, pre-emphasis intensity is adjusted so that an emphasis voltage becomes equal to or more than this threshold.

As a third embodiment corresponding to the first embodiment and a fourth embodiment corresponding to the second embodiment, a method is also possible in which the threshold of the input buffer circuit is set to a value equal to or less than a de-emphasis voltage of logic "0". In this case, pre-emphasis intensity is adjusted so that an emphasis voltage becomes equal to or less than this threshold.

More specifically, in the determinations at S1 of FIG. 3 and S11 of FIG. 9 and in the signals at S2 and S3 of FIG. 3 and S12 and S13 of FIG. 9, the polarity is reversed.

The present invention is not limited to the configurations shown in the above described first to fourth embodiments; and the present invention can be implemented as any method in which the threshold of the input buffer circuit can be set to a given range determined according to a de-emphasis voltage and pre-emphasis intensity can be adjusted so that an emphasis voltage falls into a given range determined according to this threshold.

While this invention has been described in connection with certain preferred embodiments, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

What is claimed is:

1. A signal level adjustment method for adjusting a level of a signal outputted from a signal output circuit, the method comprising:
setting a threshold of a signal input circuit to a first variable value by a control circuit;
determining a level of a first signal in said signal output circuit by the control circuit so that a voltage of said first signal, outputted from said signal output circuit and inputted to said signal input circuit, falls into a given range defined based on said threshold,
wherein said determining said level of said first signal comprises selecting a value from a plurality of values of level including a number of values which is greater than four, said determining of the level of said first signal being based on a feedback of a received signal from the signal input circuit according to the setting of the threshold for a repeated pattern data sent to the signal output circuit from the control circuit; and
repeatedly adjusting the level of the first signal at the signal output circuit according to a comparison of the feedback of the received signal from the signal input circuit and the repeated pattern data sent to the signal output circuit from the control circuit.

2. The method according to claim 1, wherein the output level of the first signal comprises a pre-emphasis intensity, the voltage of the first signal comprises a level of an emphasis signal, and said threshold is set in advance.

3. The method according to claim 2, wherein a determining of the pre-emphasis intensity is to a value in accordance with an amount of attenuation from a transmission line.

4. The method according to claim 1, wherein a value of the first variable is according to a de-emphasis voltage.

5. The method according to claim 1, wherein said first variable value is selected from a plurality of values.

6. The signal level adjustment method according to claim 1, wherein the selecting of the value from a plurality of values of level is according to a feedback processing from the repeated pattern data, the feedback processing comprising the setting of the threshold of a signal input circuit, and the determining of the level of the first signal so that the voltage of the first signal falls into the given range defined based on the threshold.

7. A signal level adjustment method for adjusting a level of a signal outputted from a signal output circuit, the method comprising:
setting a threshold of a signal input circuit to a first variable value by a control circuit;
determining a pre-emphasis intensity of said signal output circuit by a control circuit so that a level of emphasis signal, outputted from said signal output circuit and inputted to said signal input circuit, changes to a value in a given range defined based on said threshold,
wherein said determining said pre-emphasis intensity of said signal output circuit comprises selecting a value from a plurality of values of level including a number of values which is greater than four, said determining of said pre-emphasis intensity being based on a feedback of a received signal from the signal input circuit according to the setting of the threshold for a repeated pattern data sent to the signal output circuit from the control circuit; and
repeatedly adjusting the level of the pre-emphasis intensity at the signal output circuit according to a comparison of the feedback of the received signal from the signal input circuit and the repeated pattern data sent to the signal output circuit from the control circuit.

8. The signal level adjustment method according to claim 7, wherein said first variable value is in said given range determined based on a de-emphasis voltage.

9. The signal level adjustment method according to claim 7, wherein said first variable value is equal to or more than a de-emphasis voltage, and
said given range defined based on said threshold is equal to or more than said threshold.

10. The signal level adjustment method according to claim 7, wherein said first variable value is equal to or less than a de-emphasis voltage, and
said given range defined based on said threshold is equal to or less than said threshold.

11. The method according to claim 7, wherein the first variable value includes a factor of a de-emphasis voltage.

12. The method according to claim 7, wherein said first variable value is selected from a plurality of values.

13. The signal level adjustment method according to claim 7, further comprising a feedback process of the repeated pattern data including repeating the determining of the pre-emphasis intensity of the signal output circuit so that the level of emphasis signal changes to the value in the given range defined based on the threshold, and then returning control back to an input buffer threshold adjustment unit for the setting of the threshold of the signal input circuit.

14. A signal level adjustment system for adjusting a level of a signal outputted from a signal output circuit, the system comprising:
  a control circuit comprising:
    an input buffer threshold adjustment unit for setting a threshold of a signal input circuit to a first variable value;
    a signal level determination unit for determining a level of a first signal in said signal output circuit so that a voltage of said first signal, outputted from said signal output circuit and inputted to said signal input circuit, falls into a given range based on said threshold,
  wherein said determining said level of said first signal by the signal level determination unit comprises selecting a value from a plurality of values of level including a number of values which is greater than four, said determining of said level of said first signal by the signal level determination unit being based on a feedback of a received signal from the signal input circuit according to the setting of the threshold for a repeated pattern data sent to the signal output circuit from the control circuit, and
  wherein the control circuit repeatedly adjusts the level of the first signal at the signal output circuit according to a comparison of the feedback of the received signal from the signal input circuit and the repeated pattern data sent to the signal output circuit from the control circuit.

15. A signal level adjustment system for adjusting a level of a signal outputted from a signal output circuit, the system comprising:
  a control circuit comprising:
    an input buffer threshold adjustment unit for setting a threshold of a signal input circuit to a first variable value; and
    a signal level determination unit for determining a pre-emphasis intensity of said signal output circuit so that a level of emphasis signal, outputted from said signal output circuit and inputted to said signal input circuit, falls into a given range defined based on said threshold,
  wherein said determining said pre-emphasis intensity of said signal output circuit by said signal level determination unit comprises selecting a value from a plurality of values of level including a number of values which is greater than four, said determining of said pre-emphasis intensity by the signal level determination unit being based on a feedback of a received signal for a repeated pattern data sent to the signal output circuit from the control circuit, and
  wherein the control circuit repeatedly adjusts the level of the pre-emphasis intensity at the signal output circuit according to a comparison of the feedback of the received signal from the signal input circuit and the repeated pattern data sent to the signal output circuit from the control circuit.

16. The signal level adjustment system according to claim 15, wherein said first variable value is in a given range determined based on a de-emphasis voltage.

17. The signal level adjustment system according to claim 15, wherein said first variable value is equal to or more than a de-emphasis voltage, and
  said given range defined based on said threshold is equal to or more than said threshold.

18. The signal level adjustment system according to claim 15, wherein said first variable value is equal to or less than a de-emphasis voltage, and
  said given range defined based on said threshold is equal to or less than said threshold.

19. The signal level adjustment system according to claim 15, wherein the selecting of the value from the plurality of values of level is according to the repeated pattern data comprising a repeating of the input buffer threshold adjustment unit setting the threshold of the signal input circuit to the first variable value, and the signal level determination unit determining the pre-emphasis intensity of the signal output circuit so that the level of emphasis signal falls into the given range defined based on said threshold, and then returning a control back to the input buffer threshold adjustment unit setting the threshold of the signal input circuit until a control signal is received.

* * * * *